July 18, 1950     F. V. TOOLEY ET AL     2,515,478
APPARATUS FOR INCREASING THE
HOMOGENEITY OF MOLTEN GLASS
Filed Nov. 15, 1944
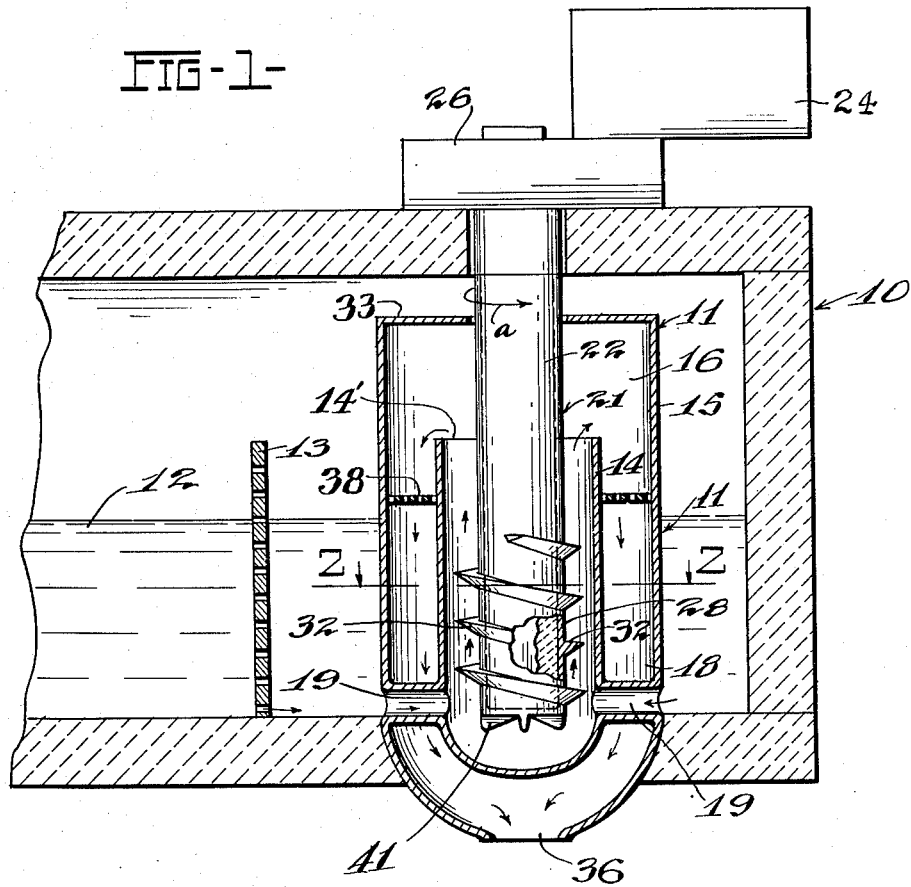
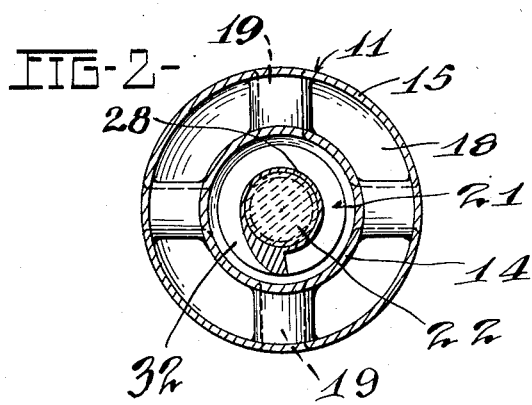
INVENTORS
F. V. TOOLEY
R. G. RUSSEL
R. B. WILEY
BY
Staehle & Overman
ATTORNEYS.

Patented July 18, 1950

2,515,478

UNITED STATES PATENT OFFICE 2,515,478

APPARATUS FOR INCREASING THE HOMOGENEITY OF MOLTEN GLASS

Fay V. Tooley, Robert G. Russell, and Ronald B. Wiley, Newark, Ohio, assignors to Owens-Corning Fiberglas Corporation, Toledo, Ohio, a corporation of Delaware Application November 15, 1944, Serial No. 563,540

8 Claims. (Cl. 49—55)

This invention relates to an improved apparatus for mixing molten glass to increase the homogeneity of the mixture.

It is one of the principal objects of this invention to improve products formed of glass and to simplify the manufacture of these products by increasing the quality of the glass.

For example, in the manufacture of glass fibers for the production of yarn and other fibrous products, it is customary to continuously flow a multiplicity of fine streams of molten glass from a body of molten glass through orifices of small diameter, and attenuate these streams into fibers. An uninterrupted flow of the glass through the orifices and uniformity of fiber diameter depend largely on the homogeneity of the glass mixture. Cords in the molten glass obstruct the orifices and result in a breakage of the strands or fibers as well as affecting the attenuation. Continued obstruction of one or more orifices requires that the operation be discontinued until the flow of glass through the orifices is again initiated, which is a time-consuming incident.

The present invention contemplates overcoming the above objections and, more generally, improving the quality of molten glass. In the latter respect, the invention is applicable in all cases where it is desired to increase the homogeneity of glass in the production of conventional glass articles.

Previously the mixing of molten glass was effected by means of paddles or stirring rods that necessarily operated only on small parts of the body of glass so that a great deal of stirring action was necessary to thoroughly mix all portions of the glass. Further, because of the viscous nature of glass the stirring action had to be relatively slow, thus requiring prohibitively long times to effect even a fair degree of mixing.

It is an important object of the invention to increase the homogeneity of molten glass by stirring or mixing the glass in a manner acting on all portions of a glass melt and to equal extent so that all of the glass is mixed, but operating on a relatively small portion of the body of molten glass at a time so that the efficiency of mixing is high and there is no need for the cumbersome conventional apparatus necessary to mix large bodies of glass.

It is a further object of the invention to positively feed the molten glass through a mixing zone to stir or mix the whole of a body of molten glass although the mixing operation is performed on only a small portion of the body at a time.

It is still another object of the invention to confine the portion of the molten glass that is undergoing mixing between relatively moving members to subject it to a shearing action that will relatively displace different parts of the glass and thereby mix the glass.

It is a further object to exert a positive feeding action on the glass simultaneously with the mixing action so that the glass is moved quickly through the mixing zone and there is no dependence on flow by gravity, as in the case of passing molten glass through strainers and screens, with the attendant slow action on the molten glass.

The foregoing, as well as other objects, will be made more apparent as this description proceeds, especially when considered in connection with the accompanying drawing, wherein:

Figure 1 is a vertical sectional view of a glass mixing device embodying the features of the present invention; and Figure 2 is a cross-sectional view taken substantially on the plane indicated by the line 2—2 of Figure 1.

Referring to Figure 1 of the drawing, the numeral 10 indicates a receptacle or forehearth of a suitable glass furnace (not shown) in which is mounted a mixing device 11 embodying the principles of this invention. The level of the molten glass flowing from the furnace is designated by the reference character 12 and this glass may be passed through a screen 13 supported in the forehearth 10 in advance of the mixing device 11 so that large cords will be divided or strung out by the screen and foreign particles and stones will be prevented from passing into the mixing device 11.

While the mixing device 11 may take different specific forms, for the purpose of illustration the device is shown in Figure 1 as comprising concentrically arranged inner and outer shells 14 and 15 respectively. The inner shell 14 is preferably in the form of a cylinder or mixing chamber and its upper end preferably projects above the normal level 12 of the molten glass. The top of the shell 14 is open providing an outlet opening 14' for the glass. The outer shell 15 projects a substantial distance above the inner shell to form a chamber 16 for receiving quantities of molten glass. The shell 15 forms with the inner shell an annular passage or conduit 18 which communicates at its upper end with the chamber 16. The shells are both formed of heat-resistant metal such as platinum or platinum alloy, but may be of ceramic refractory material coated with such metal, the aim being to prevent engagement of ceramic material by the glass after the glass is mixed and thus avoid the formation of new cords.

Molten glass flows from the forehearth 10 into the cylinder 14 through a plurality of circumferentially spaced intake openings or passages 19. The passages 19 are positioned at the floor of the forehearth and communicate with the cylinder 14 adjacent the lower end of the latter. As a result a column of molten glass is confined in the cylinder and this glass is normally prevented from flowing out the top of the cylinder 14 by the fact that the upper end of the cylinder extends above the level of the molten glass in the forehearth.

Molten glass in the cylinder 14 is mixed by a stirrer 21 including a shaft 22 which projects into the cylinder through the top of the latter and extends to a position adjacent the intake passages 19. The upper end portion of the shaft 22 projects substantially beyond the top of the shell 15 and is connected to a prime mover 24 through the medium of a suitable reduction gear unit 26. Any suitable means, such as a bearing within the unit 26, is provided for the purpose of supporting the shaft.

The shaft 22 is formed of or is coated with a heat-resistant material and in the present instance the shaft is formed of sillimanite covered with a tube 28 of platinum. As a result the shaft 22, as well as the associated parts of the mixing device 11, will withstand considerable temperatures over a long period of time.

The portion of the shaft 22 located in the cylinder has a diameter substantially less than the internal diameter of the cylinder and is provided with a helically arranged projection 32, the projection being suitably secured to or formed integral with the tube 28. The projection 32 simulates a buttress thread and the peripheral edges of the thread extend in close proximity to the inner wall of the cylinder. The direction of the spiral formed by the projection or thread 32 is such that when the shaft 22 is rotated in the direction of the arrow a in Figure 1, molten glass confined in the cylinder 14 is raised and overflows the cylinder into the chamber 16. In this connection it is pointed out that the top of the shell 15 is substantially closed by a cover 33 centrally apertured to enable extending the shaft 22 therethrough. As a result the space above the cylinder may be substantially filled with molten glass without the glass overflowing into the forehearth.

As the molten glass is elevated by the helical projection 32 on the shaft, the peripheral edges of the projection coact with the inner wall of the cylinder 14 to violently work or stir the molten glass. In actual practice it is desired to form the helical projections substantially V-shaped in cross section so that the peripheral edges of the helical projection will impart a shearing action to the glass sufficient to sever or attenuate any cords existing in the molten glass. The combined raising and shearing action on the molten glass materially increases the homogeneity of the glass with commensurate advantages in producing high quality glass articles.

As the molten glass overflows the cylinder 14 into the annular chamber 16, it moves by gravity to a discharge orifice 36 formed at the bottom of the shell 15. If desired, further mixing of the molten glass may be obtained by supporting one or more fine mesh screens 38 in horizontal position in the chamber 16 to compel the molten glass to flow therethrough. Finer mesh screens may be used to achieve a more thorough mixing of the glass in the present invention because the positive feeding action of the stirrer builds up a head of glass above the screen 38, and may even produce a pressure urging the glass through the screen when the chamber 16 fills. Previously fine mesh screens were ruled out for mixing glass because of the extent to which they retarded gravity flow of the glass.

It will also be noted from Figure 1 that agitation of the molten glass in the lower portion of the cylinder may be enhanced by forming a series of circumferentially spaced vanes 41 at the bottom of the shaft 22. These vanes will, of course, rotate with the shaft and will thereby impart a stirring action to the glass beneath the shaft and cause it to move away from the center of the chamber below the shaft so that it is urged into the space between the shaft and the cylinder 14.

From the foregoing, it will be observed that the present invention affords a relatively simple inexpensive mixing device capable of being readily installed on a conventional forehearth to insure thorough mixing of the molten glass before the latter is processed.

We claim:

1. Apparatus for mixing molten glass comprising a receptacle adapted to contain a body of molten glass, a mixing device supported within the receptacle and having a discharge opening spaced below the level of the glass in the receptacle, said device including a cylinder having openings adjacent opposite ends and extending upwardly from a point beneath the normal level of the glass in the receptacle, means providing a passage for glass from the opening at the upper end of the cylinder to said discharge opening of the mixing device, and a mechanical stirrer supported for rotation in the cylinder and having means coacting with the inner wall of the cylinder upon rotation of the stirrer to subject the column of molten glass in the cylinder to a combined feeding and shearing action to mix the glass and simultaneously feed it in an upward direction toward the opening at the top of the cylinder.

2. Apparatus for mixing molten glass comprising a receptacle containing a body of molten glass, a mixing device supported within the receptacle and having a discharge opening spaced below the level of the glass in the receptacle, said device including a cylinder open at both ends and extending upwardly from a point beneath the normal level of the glass in the receptacle to a point above the level of the glass, means exteriorly of the cylinder providing a passage for glass extending from the open upper end of the cylinder to the discharge opening of the mixing device, and means for lifting molten glass through the cylinder including a stirrer coacting with the inner wall of the cylinder to subject the molten glass to a shearing action to attenuate and reduce the size of any cords existing in the molten glass as the latter is raised in the cylinder.

3. Apparatus for mixing molten glass comprising a receptacle to contain a body of molten glass, a mixing device supported within the receptacle and having a discharge opening spaced below the level of the glass in the receptacle, said mixing device including a chamber having an intake opening adjacent the lower end thereof through which molten glass is admitted into the chamber, said chamber extending upwardly above the normal level of the glass in the receptacle and having an outlet opening spaced above the level of the molten glass, means for lifting the molten glass through the chamber, and a shell surrounding the chamber in spaced relation thereto and cooperating therewith to form a passage communicating at one end with the outlet opening of the chamber and at the other end with the discharge opening of the mixing device.

4. Apparatus for mixing molten glass comprising a receptacle to contain a body of molten glass, a vertical cylinder supported in the receptacle having an intake opening adjacent the lower end through which molten glass is admitted into the cylinder and having an outlet opening spaced above the normal level of the molten glass in the receptacle at the entrant side of the intake opening, a mechanical stirrer supported for rotation in the cylinder and having means coacting with the inner wall of the cylinder upon rotation of the stirrer to raise molten glass from the intake opening adjacent the bottom of the cylinder to the outlet opening aforesaid and to impart a shearing action on the molten glass as it is raised to the outlet opening, and a second cylinder surrounding said vertical cylinder and communicating at its one end with the outlet opening in the first cylinder and having an orifice at its other end through which molten glass flows.

5. Apparatus for mixing molten glass comprising a cylinder adapted to contain molten glass, and a rotatable member formed of refractory ceramic material extending into the cylinder, and a metallic tube closely surrounding the rotatable member and having a helical projection extending from the periphery thereof and coacting with the inner wall of the cylinder in response to rotation of the member in one direction to raise the molten glass in the cylinder.

6. Apparatus for mixing molten glass comprising a vertical cylinder adapted to contain molten glass and open at the top thereof, a vertically supported rotatable shaft extending into the cylinder through the open upper end thereof and formed of refractory ceramic material, a metallic tube closely surrounding said shaft and having a helical projection of substantially V-shaped cross section extending from the periphery thereof and coacting with the inner wall of the cylinder in response to rotation of the shaft in one direction to raise the molten glass in the cylinder and to impart a shearing action on the glass sufficient to reduce any cords existing in the molten glass to a minimum.

7. Apparatus for mixing molten glass comprising a receptacle for molten glass having side and bottom walls, a vertical cylinder within said receptacle having an intake opening adjacent the lower end through which molten glass is admitted into the cylinder and having an outlet opening above the normal level of the molten glass in the receptacle, means for raising molten glass in the cylinder to discharge the molten glass through the outlet opening in the cylinder including a rotatable member extending into the cylinder through the top of the latter and having a helical projection extending from the periphery thereof to a position in such close proximity to the inner wall of the cylinder that the molten glass is violently mixed as the member is rotated relative to the cylinder in a direction to lift the glass to said outlet opening in the cylinder, and a shell enclosing the cylinder and having the lower end projecting through the bottom wall of the receptacle and provided with an outlet opening.

8. Apparatus for mixing molten glass comprising a receptacle for molten glass, a tubular chamber in said receptacle and having an opening in its bottom, a vertical cylinder positioned within said chamber in substantially concentric relationship thereto, said cylinder having an intake opening adjacent the lower end thereof communicating with the receptacle and having an upper open end spaced above the normal level of the molten glass in the receptacle, a rotatable member extending into the cylinder in concentric relation therewith and having on its surface a helically arranged projection in the form of a screw thread substantially V-shaped in cross section, said projection coacting with the inner wall of the cylinder upon rotation of the member in one direction to subject the molten glass in the cylinder to a shearing action sufficient to thoroughly mix the glass and to simultaneously raise the molten glass to the elevation of the outlet opening in the cylinder whereupon the molten glass flows into the tubular chamber, and a screen in the tubular chamber in the path of the molten glass.

FAY V. TOOLEY.
ROBERT G. RUSSELL.
RONALD B. WILEY.

REFERENCES CITED

The following references are of record in the file of this patent:

UNITED STATES PATENTS

| Number | Name | Date |
| --- | --- | --- |
| 1,778,775 | Soubier | Oct. 21, 1930 |
| 2,055,676 | Stewart | Sept. 29, 1936 |
| 2,133,236 | Slayter et al. | Oct. 11, 1938 |

FOREIGN PATENTS

| Number | Country | Date |
| --- | --- | --- |
| 711,976 | France | July 8, 1931 |